No. 717,206. Patented Dec. 30, 1902.
W. H. JACOBY.
FISH CLEANING DEVICE.
(Application filed Feb. 24, 1902.)

(No Model.)

WITNESSES
E. G. Staude
C. G. Hanson

INVENTOR
WILLIAM H. JACOBY
BY Paul & Paul
HIS ATTORNEYS

UNITED STATES PATENT OFFICE.

WILLIAM H. JACOBY, OF MINNEAPOLIS, MINNESOTA.

FISH-CLEANING DEVICE.

SPECIFICATION forming part of Letters Patent No. 717,206, dated December 30, 1902.

Application filed February 24, 1902. Serial No. 95,208. (No model.)

*To all whom it may concern:*

Be it known that I, WILLIAM H. JACOBY, of Minneapolis, Hennepin county, Minnesota, have invented certain new and useful Improvements in Fish-Cleaning Devices, of which the following is a specification.

The object of this invention is to provide a convenient tool for removing the scales, entrails, and fins of a fish during the operation of cleaning the same.

The invention consists generally in various constructions and combinations, all as hereinafter described, and particularly pointed out in the claims.

Figure 1:
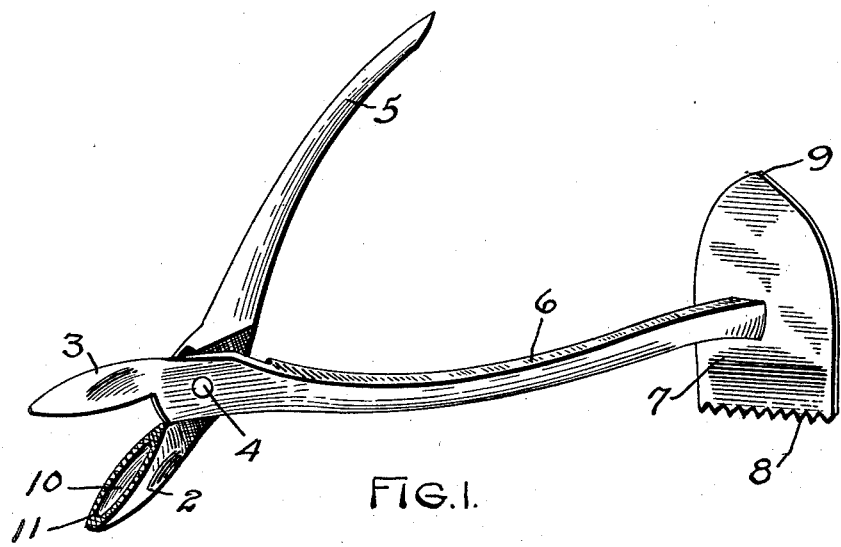
Figure 2:
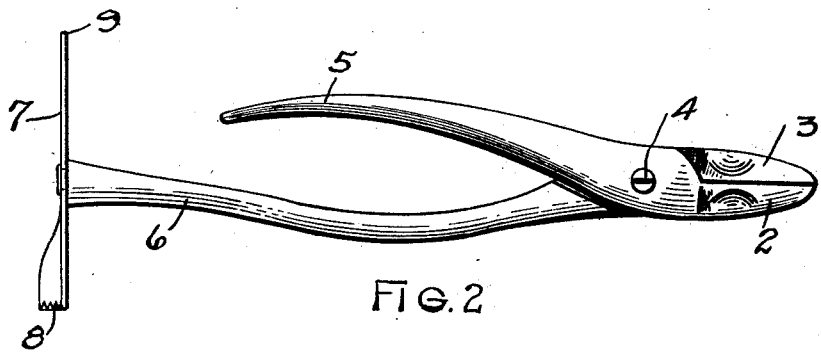

In the accompanying drawings, forming part of this specification, Figure 1 is a perspective of a fish-cleaning device embodying my invention. Fig. 2 is a side view of the same.

In the drawings, 2 and 3 represent the jaws of the device, connected by a pivot 4 and provided with handles 5 and 6, the latter being considerably longer than the handle 5 and provided at its end with a sheet-metal triangular plate 7. This plate is outwardly bulged or curved at its lower edge and provided with a series of teeth 8, with which the fish-scales are removed as the device is drawn over the body of the fish. This bulge or curve in the plate forms a little pocket above the scale-removing teeth or edge, wherein the scales collect as they are scraped off and rolling over and over precede the plate as it is drawn over the fish. I consider this bulge or pocket as quite an important feature of my invention, as I have found it prevents the scales from flying up in the face and over the clothes of the person using the device. The plate 7 has a blunt-pointed upper end 9, with which the entrails can be easily and quickly removed upon opening the body of the fish and drawing the device through the same. The part 9 has its edges curved to conform to the shape of the interior of a fish, and the point of the part 9 will when the device is in operation scrape along over the backbone and effectually remove all the organs which heretofore it has been necessary to pick out with the fingers or scrape with a knife.

The jaws 2 are preferably provided with concave faces 10, that are inclosed by flat serrated or roughened surfaces 11 at the edges of the jaws. These hollow-faced jaws are adapted to grip the fins and draw them out of the fish, the ribbed surfaces preventing the device from slipping.

I claim as my invention—

1. A fish-cleaning device, comprising pivotally-connected jaws provided with suitable handles one being longer than the other, and a triangular plate secured to the end of the longer handle substantially at right angles to the plane thereof.

2. A fish-cleaning device, comprising pivotally-connected jaws having suitable handles, one longer than the other, and a triangular plate secured upon the end of the longer handle, said plate having a curved toothed edge at one end to remove the fish-scales and rounded at its opposite end, for the purpose specified.

3. A fish-cleaning device, comprising jaws 2 and 3 pivotally connected and provided with handles 5 and 6 the latter being longer than the former, the sheet-metal plate 7 centrally secured to the end of said handle 6 substantially at right angles to the plane thereof, said plate 7 having a series of teeth at one end and rounded edges at the other terminating in a blunt point, substantially as described.

4. A fish-cleaning device, comprising pivotally-connected jaws provided with suitable handles, one being longer than the other, and a plate secured at or near the end of said longer handle, and provided with a scale-removing edge and a rounded blunt-pointed edge, for the purpose specified.

In witness whereof I have hereunto set my hand this 20th day of February, 1902.

WILLIAM H. JACOBY.

In presence of—
RICHARD PAUL,
C. G. HANSON.